UNITED STATES PATENT OFFICE.

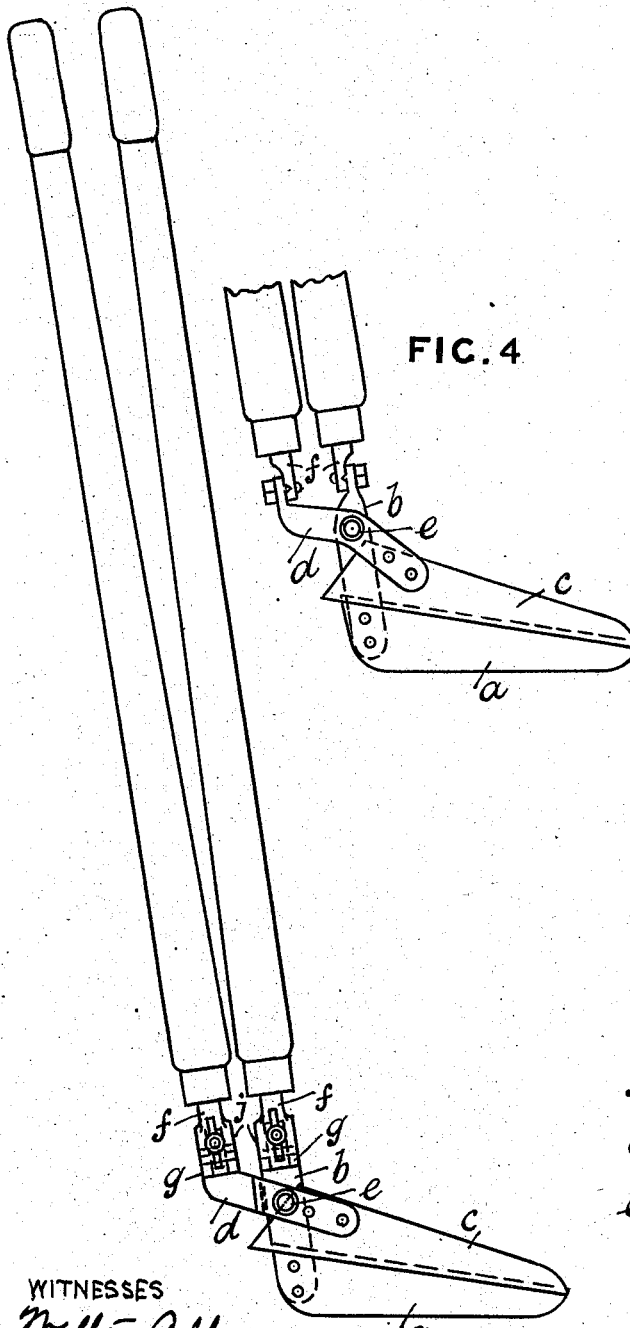

WALTER SELLEY, OF MANCHESTER, ENGLAND, ASSIGNOR OF ONE-HALF TO ROBERT LAMB, OF MANCHESTER, ENGLAND.

GARDEN-SHEARS.

No. 894,710.     Specification of Letters Patent.     Patented July 28, 1908.

Application filed August 12, 1907. Serial No. 388,130.

*To all whom it may concern:*

Be it known that I, WALTER SELLEY, a subject of the King of Great Britain and Ireland, and residing at 36 Crescent road, Cheetham Hill, Manchester, in the county of Lancaster, England, have invented a new and useful Improvement in Garden-Shears, of which the following is a specification.

My invention relates to an improvement in garden shears to enable them to be adapted either for the purpose of edging grass lawns or borders, flat cutting, hedge cutting and the like.

In the accompanying drawing illustrating my invention Figure 1 is a side view, and Fig. 2 an edge view of a pair of garden shears. Fig. 3 is a side view with the blades set at an angle. Fig. 4 is a side view of the same slightly modified.

In these views the same letters refer to like parts.

The object of my invention is to enable one pair of garden shears to be utilized for the various purposes as hereinbefore named, in place of requiring special shears for each class of work.

Referring to the drawing, the heel of the blade $a$ is formed with or connected to a short straight shank $b$ and the blade $c$ is formed with or connected to a short angular shank $d$, the two blades being connected by a rivet $e$ passed through these shanks as shown, the blade $c$ thereby having a drawing or shearing action. I make the upper end of each shank in the form of a hinge, and connect this to a spike $f$, that is driven into the handle and whose end is correspondingly formed. I do not confine myself to the precise form of said hinged joint, it may be as shown in Figs. 1, 2, and 3, in which a convex semi-circular end $g$ fits into a concave semi-circular end $j$, with recesses and projections therein and thereon, said ends being fastened together by thumb screws, or they may be formed flat with recesses and projections therein and thereon, as shown in Fig. 4 and secured together in like manner, or said ends may be of other preferred form. By these means the position of the blades relatively with the handles may be changed either from being in the same plane to any required angle or the reverse.

I claim as my invention:—

1. A pair of shears having handles, blades provided with shanks, means in connection with the latter for pivoting said blades together and a pivotal connection between the respective shanks and handles whereby the position of said blades may be changed with respect to said handles, substantially as described.

2. A pair of shears having unconnected handles, blades provided with shanks, means in connection with the latter for pivoting said blades together so as to secure a shearing action and a pivotal connection between each of said shanks and handles respectively whereby the position of said blades may be changed with respect to said handles, substantially as described.

In testimony whereof I have signed my name to this specification, in the presence of two subscribing witnesses.

WALTER SELLEY.

Witnesses:
    THOS. PRESCOTT,
    J. ERNEST HUGHES.